United States Patent [19]
Minder

[11] Patent Number: 5,482,243
[45] Date of Patent: Jan. 9, 1996

[54] SEAT ADJUSTER SLIDE ARRANGEMENT

[75] Inventor: Ernest A. Minder, Rochester Hills, Mich.

[73] Assignee: General Motors Corporation, Detroit, Mich.

[21] Appl. No.: 192,898

[22] Filed: Feb. 7, 1994

[51] Int. Cl.⁶ ................................................. F16M 13/00
[52] U.S. Cl. ..................................... 248/345.1; 248/429
[58] Field of Search ................................ 248/429, 345.1, 248/424, 425, 430, 419, 420; 297/346, 317, 318, 329, 322; 296/65.1

[56] References Cited

U.S. PATENT DOCUMENTS

| | | | |
|---|---|---|---|
| 4,630,545 | 12/1986 | Michel | 105/329.1 |
| 5,039,166 | 8/1991 | Kojho | 297/344 |
| 5,098,162 | 3/1992 | Forget et al. | 297/482 |
| 5,188,329 | 2/1993 | Takahara | 248/430 |
| 5,195,712 | 3/1993 | Goodall | 248/430 |
| 5,199,926 | 4/1993 | Hennig et al. | 464/170 |
| 5,209,447 | 5/1993 | Yokota | 248/429 |
| 5,228,659 | 7/1993 | Potes, Jr. et al. | 248/429 |
| 5,242,143 | 9/1993 | Nagashima et al. | 248/345.1 |
| 5,275,369 | 1/1994 | Kamata et al. | 248/345.1 |
| 5,285,993 | 2/1994 | Kamata et al. | 248/345.1 X |

FOREIGN PATENT DOCUMENTS

| | | | |
|---|---|---|---|
| 2-126935 | 3/1989 | Japan | 248/345.1 |
| 3-51624 | 9/1989 | Japan | 248/345.1 |
| 3-86837 | 12/1989 | Japan | 248/345.1 |

*Primary Examiner*—Karen J. Chotkowski
*Attorney, Agent, or Firm*—Ernest E. Helms

[57] ABSTRACT

A seat adjuster slide arrangement is provided including in a preferred embodiment a floor channel connected to a vehicle floor and having two generally parallel spaced vertical extensions, each extension having a projecting flange, the floor channel also having first and second ends; a seat channel mounted on the floor channel; a floor cover for concealing the floor channel first end, the floor cover having legs extending parallel to the vertical extensions and also having a central portion bridging across the floor channel with a recessed depression; an inner cover attached to the seat channel; a spring connected to the inner cover; and an outer cover telescopically mounted on the inner cover and spring biased to a covering position over the inner cover, the outer cover having a front face bridging over the seat channel and having an alignment member and fingers projecting toward the floor channel first end, the alignment member being laterally between the fingers, and when the seat channel is displaced toward the floor channel second end, the fingers become entrapped under the flanges of the floor channel and the legs of the floor cover and the alignment member is received into the recessed depression to stabilize the outer cover with respect to the floor channel.

6 Claims, 4 Drawing Sheets

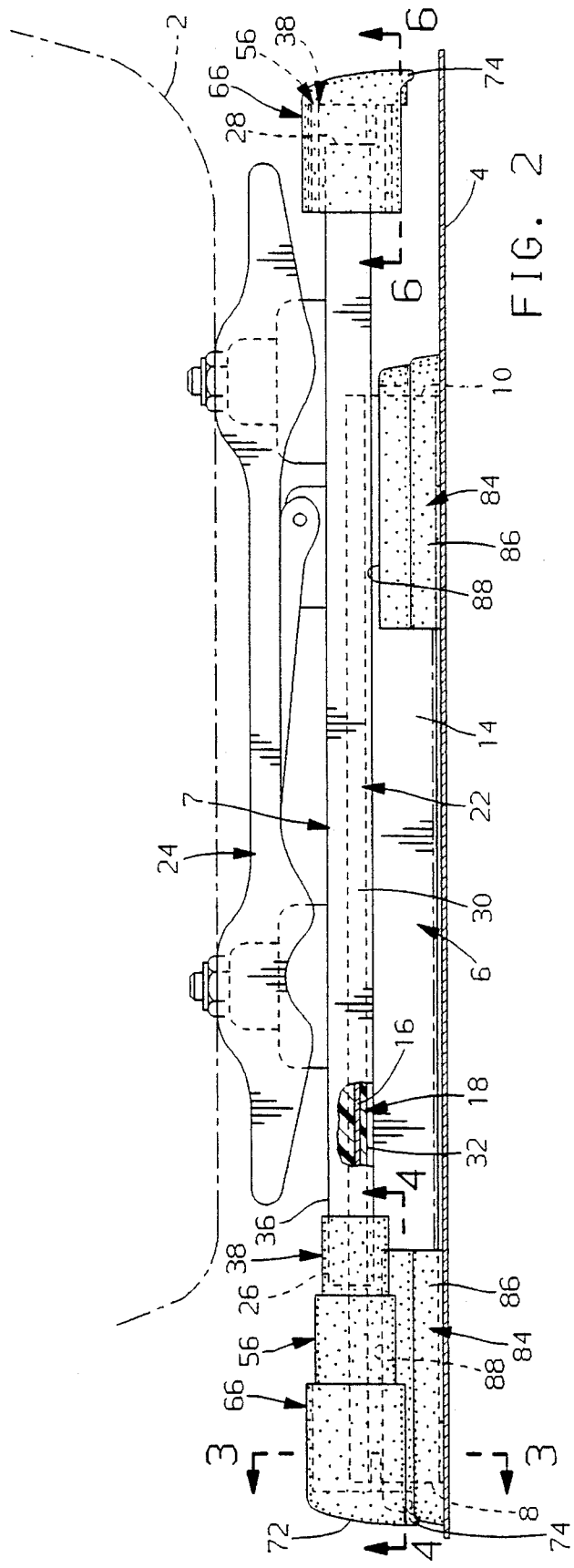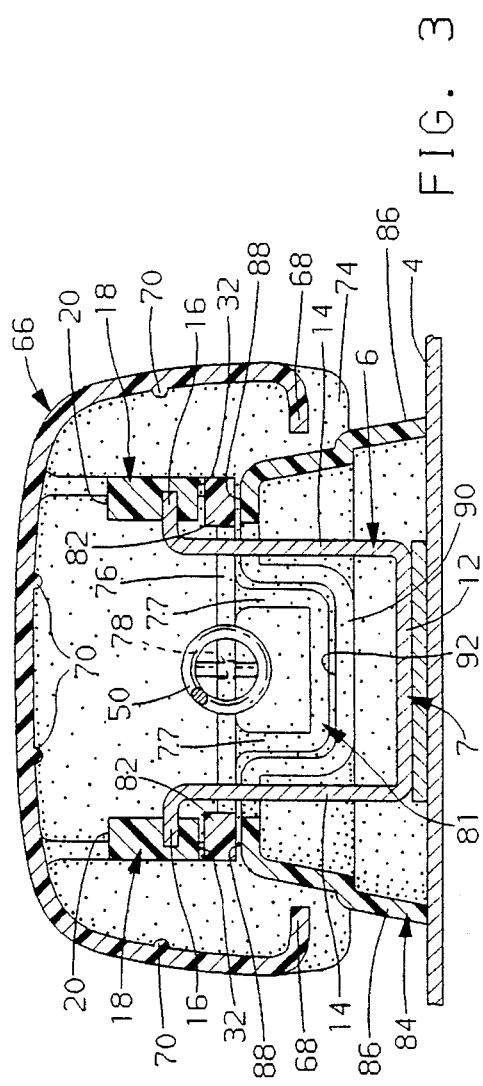

SEAT ADJUSTER SLIDE ARRANGEMENT

FIELD OF THE INVENTION

The field of the present invention is that of seat adjuster slides with end covers.

BACKGROUND OF THE INVENTION

Seat adjuster slides have a floor channel (sometimes referred to as a lower rail or lower channel) connected to the vehicle floor. Slidably mounted on top of the floor channel is a seat channel (sometimes referred to as a top or upper channel). To increase passenger comfort, the current trend is to allow the seat channel to have a greater adjustment range with respect to the floor channel. As the seat channel moves a greater extent with respect to the floor channel, more and more of the floor channel is exposed. To cover the floor channel, various arrangements have been made. Examples of such arrangements can be found in a review of U.S. Pat. Nos. 5,188,329 and 5,209,447.

SUMMARY OF THE INVENTION

The present invention provides an adjuster slide arrangement having a cover which is an alternative to the aforementioned patents.

BRIEF DESCRIPTION OF THE DRAWINGS

FIG. 2 is a view taken along line 2—2 of FIG. 1.

FIGS. 3 and 4 are views taken along lines 3—3 and 4—4, respectively, of FIG. 2.

DETAILED DESCRIPTION OF THE INVENTION

Figure 1:
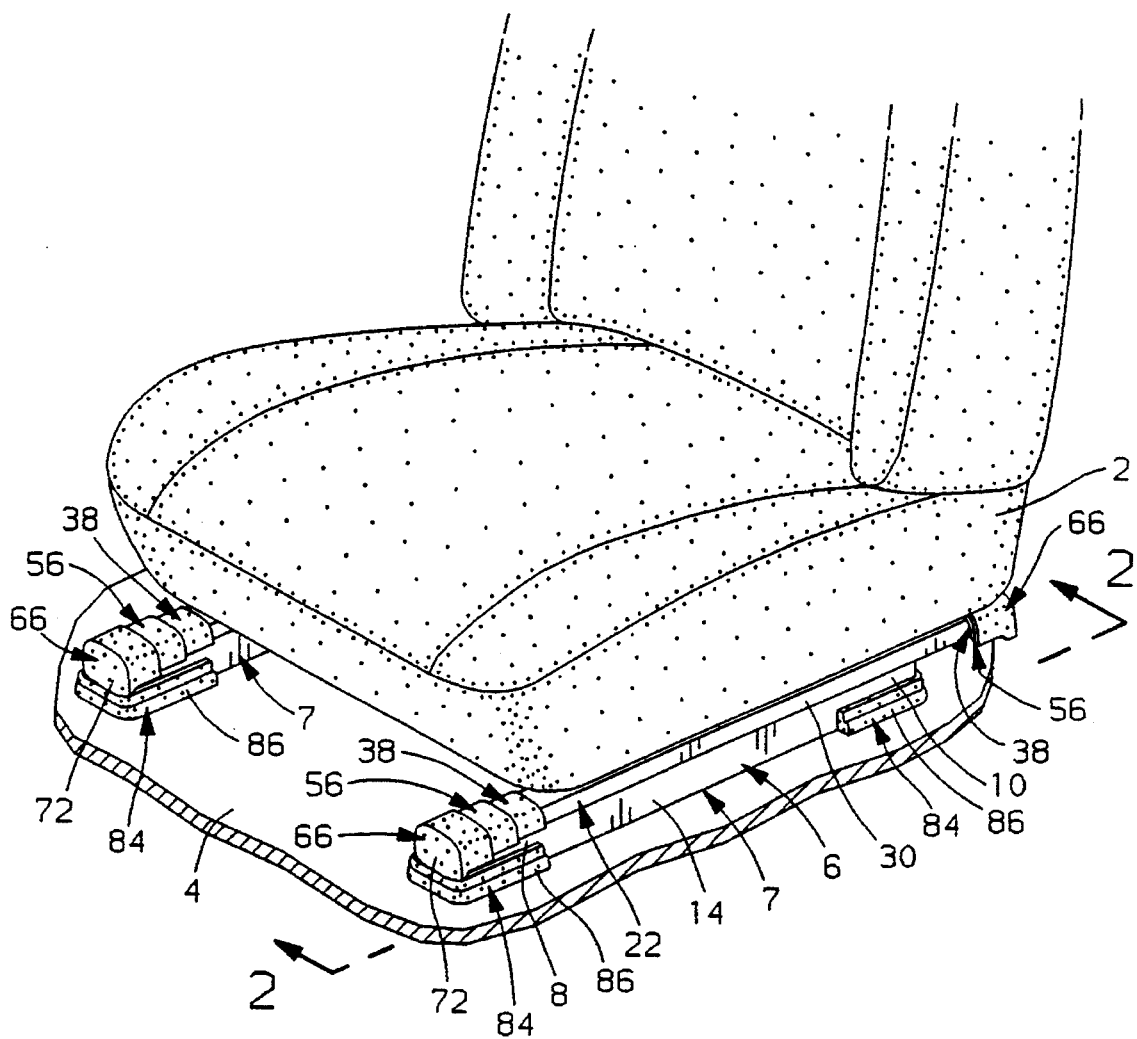
FIG. 1 is a perspective view of a preferred embodiment of the present invention utilized in its environment.
Figure 4:
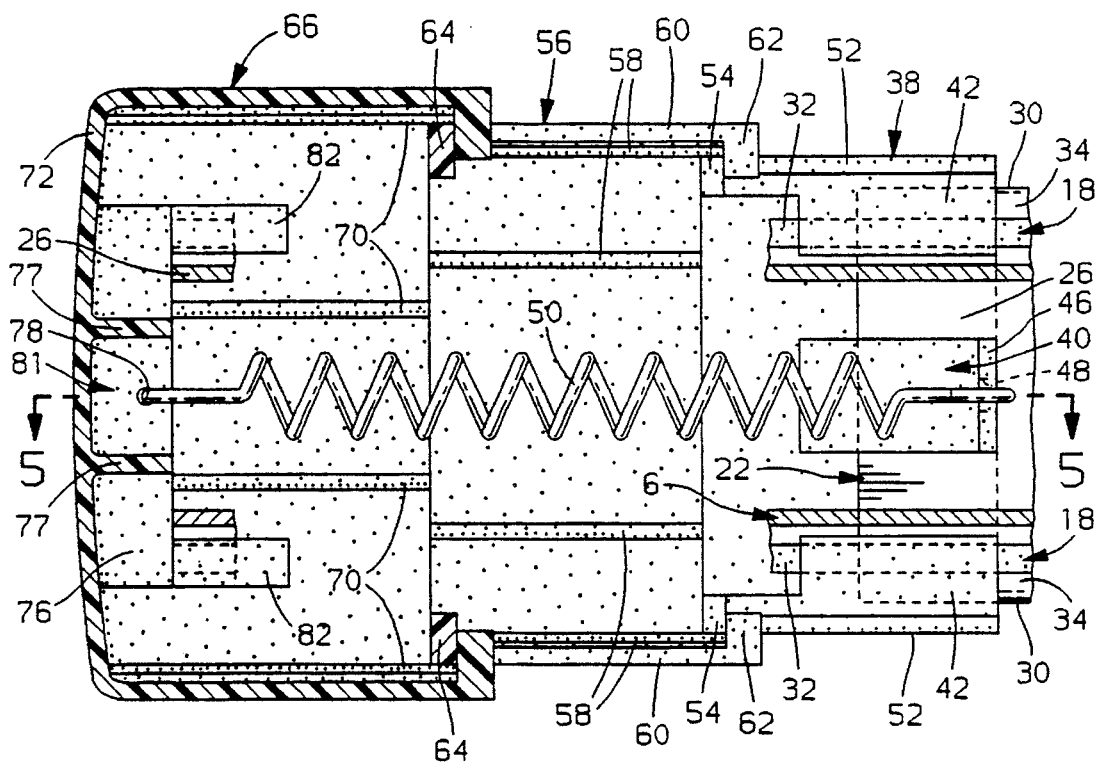
Figure 5:
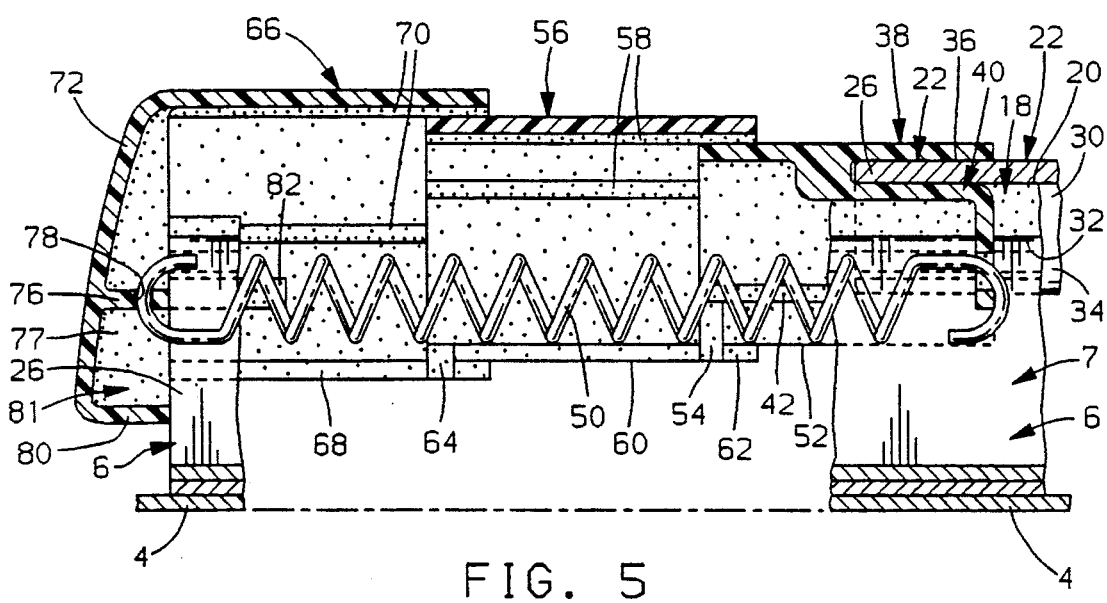
FIG. 5 is a view taken along line 5—5 of FIG. 4.

Referring to FIG. 1, the present inventive seat adjuster slide arrangement 7 is shown in its operational environment with a seat 2 placed on top thereon. The adjuster slide arrangement is mounted to a vehicle floor 4. Referring additionally to FIGS. 2 and 3, the adjuster slide 7 as shown is a six-way powered seat adjuster identical or similar to that described in Borlinghaus, U.S. Pat. No. 4,664,351. However, the present invention is not limited to such six-way powered seat adjusters and may also be used in manual-type adjusters. The adjuster arrangement 7 has a floor channel 6.

The floor channel 6 has a forward, first end 8 and a rearward, second end 10. The floor channel 6 has a reinforced central, cross-sectional area 12 which is connected to the vehicle floor 4 directly or via a stand by welding, threaded fasteners or other suitable connective means. The floor channel 6 has two parallel-spaced, generally vertical extensions 14. Each vertical extension 14 has a generally horizontally projecting flange 16. Each flange 16 is encapsulated in a plastic shoe 18 for a substantial portion of its length starting from the first and second ends 8 and 10.

Figure 6:
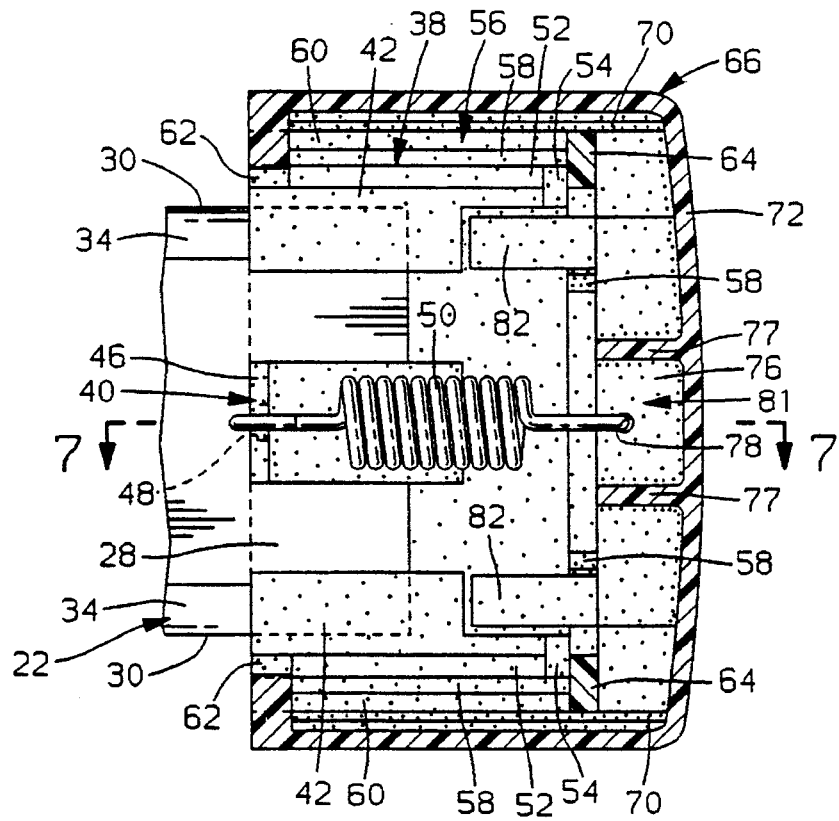
FIG. 6 is a view taken along line 6—6 of FIG. 2.

Slidably mourned on a top surface 20 of the plastic shoe 18 is a seat channel 22. The seat channel 22 is directly connected to the vehicle seat 2 in a fore and aft seat adjuster arrangement or in a four- or six-way adjuster is connected to the vehicle seat 2 by an appropriate adjustable lift mechanism 24. The seat channel 22 has a top surface 36. The seat channel 22 has first and second ends 26, 28 generally corresponding to and generally aligned with the first and second ends 8 and 10 of the floor channel 6. The seat channel 22 has two side edges 30 and two inwardly extending bottom flanges 34 shown in FIGS. 6 and 7 which slide against a bottom surface 32 (shown in FIG. 3) of the plastic guide 18. The bottom flanges 34 of the seat channel generally terminate laterally inwardly at about the same inner lateral dimension of the plastic shoe 18, leaving the majority of the seat channel 22 open underneath. The open space is typically required to accommodate portions of the mechanism 24 (underneath the top surface 36, not shown) which lifts the seat 2 with respect to the seat channel 22 or those portions of the adjuster mechanism which translate the seat channel 22 with respect to the floor channel 6 (also not shown).

Referring additionally to FIGS. 4 through 7, connected with the top surface 36 along its first end 26 and second end 28 are identical or substantially similar inner covers 38. Each inner cover 38 has a center leg 40 which extends almost parallel with the top surface 36 of the seat channel, providing an interference fit with the top surface 36 of the seat channel to retain the inner cover 38 with the seat channel 22. Additionally, the inner covers 38 have an underflange 42 (best shown in FIGS. 4 and 6) which, by a slight interference fit, aids the retention of the inner cover 38 with the seat channel 22 by pressing against the seat channel bottom flange 34.

The center leg 40 of the seat channel also has a generally vertically extending portion 46 having an aperture 48 to provide for the attachment of a spring 50. The spring 50 when extended has a spring force of approximately three pounds.

The inner cover 38 has a bottom runner surface 52 and a limiting extension 54.

Telescopically and slidably mounted on the inner cover 38 is an intermediate cover 56. The intermediate cover 56 has a series of runners 58 to move with less friction on and off the inner cover 38. The intermediate cover 56 has a bottom riser surface 60 having an inward extending flange 62 as its end. The flange 62 rides against the runner surface 52 of the inner cover and is prevented from removal from the inner cover by the downward extension 54 of the inner cover 38. Inner cover 56 also has a downward projecting extension 64 at its end opposite flange 62.

Slidably telescopically mounted on the intermediate cover 56 is an outer cover 66. The outer cover 66 has an inwardly extending flange portion 68 which interlocks with vertical extension 64 in a manner similar to that described as the interlock between vertical extension 54 and the flange 62. The outer cover 66 also has a series of risers 70 to allow it to more easily slide upon intermediate cover 56.

The outer cover 66 has a front face 72 which bridges over the end of the seat channel. Projecting from the face 72 is a mid-horizontal wall 76 with an aperture 78 for capturing an end of the spring 50. Mid-horizontal wall 76 has descending from it two generally vertical walls 77. A second horizontally extending wall 80 joins walls 77. Walls 76, 77 and 80 form an alignment stud projection 81 (FIG. 3). The from face 72 also has projecting therefrom two parallel spaced fingers 82.

Covering the ends 8, 10 of the floor channel are U-shaped floor covers 84. Each floor cover 84 has two legs 86 which extend in a fore and aft direction parallel with the vertical extensions 14 of the floor channel. The top of each leg 86 has a flat 88. Bridging over the flats 88 is a cover base 90. The base 90 has a recessed depression 92 (FIG. 3). The floor cover 84 may be glued to the vehicle floor 4 or attached by other suitable means, or an alternative embodiment may be connected to the floor channel 6. In an embodiment not illustrated, the floor cover is connected with a clip by a melt bond. The clip extends from underneath the recessed depression 92 to an area inside the central area 12 of the floor channel. A threaded fastener then connects both the clip and the floor channel 6 to the vehicle floor 4. The floor cover 84, outer cover 66, intermediate cover 56 and inner cover 38 can easily be fabricated by a moldable polymeric material such as acetal resin.

Figure 7:
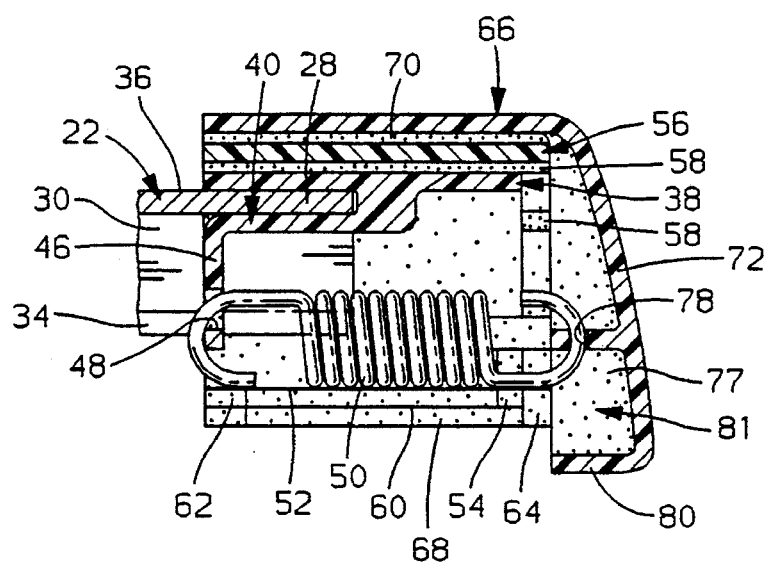
FIG. 7 is a view taken along line 7—7 of FIG. 6.

In operation, the inner cover 38 is first slid onto the top surface 36 of the seat channel 22. A slight bending of the intermediate cover 56 will allow it to be attached to the inner cover 38, with the plastic being pliable enough to allow it to be deformed to the point that the interlock between the intermediate cover flange 62 and the extension 54 of the inner cover may easily be achieved. In like manner, the outer cover 66 is connected to the intermediate cover 56. Subsequent or prior to the above-noted operations, the spring 50 can be attached with the leg portion 46 and the mid-horizontal wall member 76, thereby biasing the outer cover 66 to a position as shown in FIG. 7 wherein it covers both the intermediate and inner covers 56 and 38. Typically, the spring will exert approximately three foot pounds of force. Typically, the length of the seat channel 22 and the length of the floor channel 6 will nearly be identical, and at both the rear and front ends of the seat 2, the adjuster slide covers will be in a position as shown in FIG. 7, when the seat 2 is positioned at its "neutral" fore and aft position.

As the seat channel 22 is moved from a position where it is directly aligned with the floor channel 6 to a position as shown in FIG. 2 where it has been displaced rightwardly, the outer 66 and intermediate 56 covers on the rear of the seat 2 or the right-hand side as shown in FIG. 2 will just ride on the inner cover 36. At the opposite or front end of the adjuster assembly 7, the displacement of the seat channel 22 will cause the fingers 82 of the outer cover to be entrapped under the lower surface 32 of the plastic shoe and above the flat 88 of the lower cover legs. Simultaneously with the above-noted actions, the alignment projection 80 of the outer cover will nest itself in the recessed depression 92 of the floor cover. The depression 92 is open in the fore and aft directions to allow clearance for fasteners or mechanisms connected to the top surface 36 of the seat channel to have passage therethrough. Typically, the lateral clearance 95 between the alignment extension 81 and the recessed depression 92 is even smaller than that of the lateral clearance between the fingers 82 and the vertical extensions 14 of the floor channel. Therefore, the cover will be laterally aligned by the alignment extension 81 and will be confined in the vertical direction and the lateral direction of the fingers 82 which are captured between the flange 16, the vertical extensions 14 and the upper flat 88 of the lower cover legs. Further rightward movement of the adjuster slide 22 will cause the contact portion 74 to contact the base 90 of the floor cover, thereby stopping further rightward movement of the outer cover 66. The intermediate cover 56 and the inner cover 38 will continue to move rightwardly until the vertical extension 64 contacts the flange 68, whereupon the intermediate cover 56 will cease movement. Then, only the inner cover 38 will continue rightwardly along with the seat channel 22. Typically, the length of adjustment of the covers 66, 56 and 38 will be such that the maximum travel of the seat channel 22 with respect to the floor channel 6 will be less than the maximum extension of the cover members. The spring 50 will become elongated, and the movement of the seat to a more forward position as shown in FIG. 1 (leftward) will cause the spring 50 to retract, returning the covers 66, 56 and 38 to their respective positions with one another as shown in FIG. 7.

Because each finger 88 is confined in two directions vertically and one direction laterally and since the alignment extension 81 is confined laterally in two directions and vertically in one direction, it is fairly difficult for an inadvertent kick or contact with the outer cover 66 to dislodge it from the seat channel 6 when the seat channel 22 is adjusted in an extreme position.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A seat adjuster slider arrangement comprising:
a floor channel for connection with a floor of a vehicle, the floor channel having two generally parallel spaced vertical extensions, each extension having a generally horizontally projecting flange, the floor channel also having first and second ends;
a seat channel slidably mounted on the floor channel having first and second ends generally aligned with the floor channel first and second ends;
a generally U-shaped floor cover for concealing a major portion of the floor channel first end attached to the vehicle floor, the floor cover having legs generally extending parallel to the vertical extensions projecting in a direction toward the floor channel second end, the floor cover having a central portion bridging across the first end of the floor channel;
an inner cover attached to the seat channel;
a spring connected to the inner cover member; and
an outer cover member slidably telescopically mounted on the inner cover and connected to the spring to be biased to a covering position with respect to the inner cover, the outer cover having a front face bridging over the seat channel first end and having two spaced apart fingers projecting toward the floor channel first end whereby when the seat channel is displaced toward the floor channel second end, the fingers become entrapped between the flanges of the floor channel and the legs of the floor cover to stabilize the outer cover with respect to the floor channel.

2. A seat adjuster slide arrangement as described in claim 1 wherein the outer cover is limited in its movement toward the second end of the seat channel by contact with the inner cover.

3. A seat adjuster slide arrangement as described in claim 1 wherein the floor cover central portion has a recessed depression and wherein the outer cover front face has an alignment projection which projects into the recession to stabilize the front cover when the fingers of the front cover are projecting under the flange of the floor channel.

4. A seat adjuster slide arrangement as described in claim 3 wherein the recessed depression in the floor cover is lower than the fingers of the outer cover face.

5. A seat adjuster slide arrangement as described in claim 1 wherein there is an intermediate cover between the inner cover and the outer cover.

6. A seat adjuster slide arrangement comprising:
a floor channel for connection with a floor of a vehicle, the floor channel having two generally parallel spaced vertical extensions, each extension having a generally horizontally projecting flange, the floor channel also having first and second ends;

a seat channel slidably mounted on the floor channel having first and second ends generally adjacent the floor channel first and second ends;

a generally U-shaped floor cover for concealing a major portion of the floor channel first end attached to the vehicle floor, the floor cover having legs generally extending parallel to the vertical extensions projecting in a direction toward the floor channel second end, the floor cover having a central portion bridging across the first end of the floor channel with a recessed depression;

an inner cover attached to the seat channel;

a spring connected to the inner cover member; and an outer cover member slidably telescopically mounted on the inner cover and connected to the spring to be biased to a covering position with respect to the inner cover, the outer cover having a front face bridging over the seat channel first end having an alignment member and two fingers projecting toward the floor channel first end, the alignment member being laterally between the two fingers, and the outer cover having a contact surface, and when the seat channel is displaced toward the first channel second end, the fingers become entrapped under the flanges of the lower channel and the legs of the floor cover and the alignment member is received into the floor cover recessed depression to stabilize the outer cover with respect to the floor channel and contact of the contact surface of the outer cover with the floor cover limits travel of the outer cover toward the floor channel second end.

* * * * *